(12) United States Patent
Tamura et al.

(10) Patent No.: US 8,602,184 B2
(45) Date of Patent: Dec. 10, 2013

(54) VIBRATION DAMPING DEVICE

(75) Inventors: Naoki Tamura, Toyota (JP); Mitsuhiro Kawaminami, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 250 days.

(21) Appl. No.: 12/962,736

(22) Filed: Dec. 8, 2010

(65) Prior Publication Data

US 2011/0132706 A1 Jun. 9, 2011

(30) Foreign Application Priority Data

Dec. 9, 2009 (JP) .................................. 2009-279600

(51) Int. Cl.
*F16F 11/00* (2006.01)

(52) U.S. Cl.
USPC ............................ 188/381; 188/380; 267/148

(58) Field of Classification Search
USPC ........................................... 267/148, 41, 260
See application file for complete search history.

(56) References Cited

U.S. PATENT DOCUMENTS

2007/0144841 A1* 6/2007 Chong et al. ............... 188/266.7
2010/0314210 A1* 12/2010 Amano et al. ............... 188/381

FOREIGN PATENT DOCUMENTS

| JP | 2008157427 A | 7/2008 |
|----|--------------|--------|
| JP | 2008157428 A | 7/2008 |
| JP | 2008157429 A | 7/2008 |
| JP | 2008248978 A | 10/2008 |
| JP | 2009092099 A | 4/2009 |
| JP | 2009092201 A | 4/2009 |

* cited by examiner

*Primary Examiner* — Thomas Irvin

(74) *Attorney, Agent, or Firm* — Gifford, Krass, Sprinkle, Anderson & Citkowski, P.C.

(57) ABSTRACT

A vibration damping device for a vibration damping target has a linear member that includes a plurality of wires, which are held so that each of the plurality of wires is relatively displaced in a state that the wires are in contact with one another, and a cover member that covers a peripheries of the plurality of wires, wherein the plurality of wires and part of the cover member are fixed to the vibration damping target, and a region of the linear member that flexes through plastic deformation of the linear member is located near each point where the linear member is fixed to the vibration damping target.

8 Claims, 2 Drawing Sheets

VIBRATION DAMPING DEVICE

CROSS REFERENCE TO RELATED APPLICATIONS

The present application claims priority of Japanese Patent Application No. 2009-279600 filed on Dec. 9, 2009, which is incorporated herein by reference in its entirety including the specification, drawings and abstract.

BACKGROUND OF THE INVENTION

1. Field of the Invention

The invention relates to a vibration damping device that damps vibrations of an object. In particular, the invention relates to a vibration damping device that damps vibrations of an object by converting vibrational energy of the object into frictional heat energy.

2. Description of the Related Art

Conventionally, vibrations of a vibration damping target are damped by mounting a linear member such as a cable, a wire or the like to the vibration damping target so that the vibrational energy of the vibration damping target is absorbed by the linear member.

For example, the vibration damping devices described in each of Japanese Patent Application Publication No. 2008-248978 (JP-A-2008-248978), Japanese Patent Application Publication No. 2009-92201 (JP-A-2009-92201), and Japanese Patent Application Publication No. 2008-157429 (JP-A-2008-157429) have a linear member fixed to a boss portion of a transmission case, which serves as the vibration damping target.

In each vibration damping device, when the transmission case vibrates, the vibrations thereof are transmitted to the linear member, and wires in the linear member rub against each other to convert vibrational energy into frictional heat energy. Accordingly, the vibrations of the transmission case are damped.

SUMMARY OF THE INVENTION

The invention provides a vibration damping device that damps vibrations of a vibration damping target by converting vibrational energy into heat energy by means of a linear member fixed to the vibration damping target and further enhances a vibration damping effect through a simple structural improvement.

An aspect of the invention relates to a vibration damping device for a vibration damping target. The vibration damping device includes a linear member that includes a plurality of wires, which are held so that each of the plurality of wires is relatively displaced in a state that the wires are in contact with one another, and a cover member that covers a peripheries of the plurality of the wires, wherein: the plurality of the wires and part of the cover member are fixed to the vibration damping target; and a region of the linear member that flexes through plastic deformation of the linear member is located near each point where the linear member is fixed to the vibration damping target.

According to the above vibration damping device, when vibrations of the vibration damping target are transmitted to the linear member, vibrations are induced at the region of the linear member that is fixed to the vibration damping target serving as a node. Accordingly, vibrational energy is converted into frictional heat energy in the linear member, but a compressive force generated through plastic deformation remains in the plastic flexure portion of the linear member. The compressive force enhances the frictional forces between the plurality of the wires and the frictional forces between the wires and the cover member. As a result, vibrational energy is efficiently converted into frictional heat energy, and vibrations of the vibration damping target are more effectively damped.

BRIEF DESCRIPTION OF THE DRAWINGS

The foregoing and further features and advantages of the invention will become apparent from the following description of an example embodiment of the invention with reference to the accompanying drawings, wherein like numerals are used to represent like elements and wherein.

DETAILED DESCRIPTION OF EMBODIMENT

Figure 1:
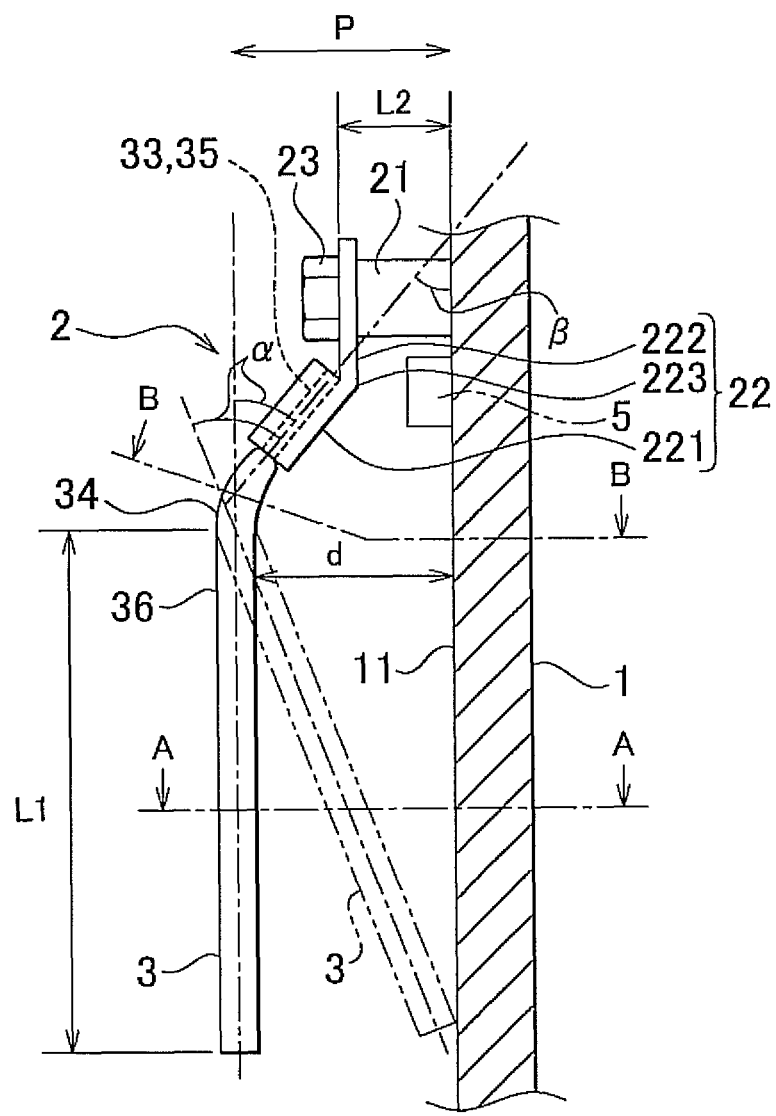
FIG. 1 is a view showing a vibration damping device according to the embodiment of the invention and a wall of a transmission case serving as a vibration damping target.

The embodiment of the invention will be described below with reference to the drawings. FIG. 1 is a view showing a vibration damping device according to the embodiment of the invention and a vibration damping target. In the embodiment of the invention, a wall 1 of a transmission case mounted on a vehicle is depicted as an example of a vibration damping target.

The vibration damping device is composed of a linear member 3, a attachment portion 2, and the like. A base end 33 of the linear member 3 is fixed to the wall 1 of the transmission case via the attachment portion 2.

Figure 2A:
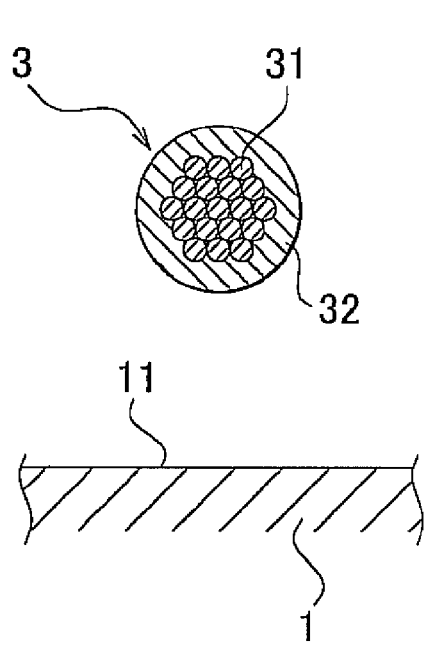
FIG. 2A is a cross-sectional view of FIG. 1 taken along a line A-A and FIG. 2B is a cross-sectional view of FIG. 1 taken along a line B-B.
Figure 2B:
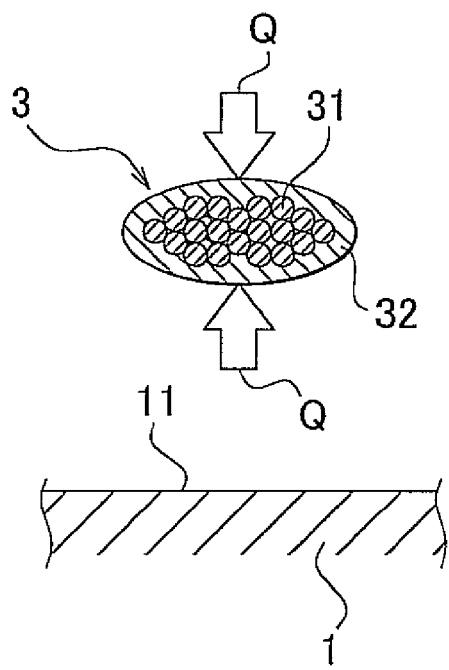

As shown in FIGS. 2A and 2B, the linear member 3 is composed of a plurality of wires 31 that are in contact with one another, and a cover member 32 that covers the peripheries of the plurality of these wires 31. The linear member 3 converts vibrational energy transmitted from the wall 1 of the transmission case into heat energy. For example, a multitude of metal wire rods are bundled or twined and used as the wires 31. The wires 31 are relatively displaced in a state that the wires 31 are in contact with one another in a longitudinal direction thereof when the linear member 3 vibrates. The cover member 32 may be formed from a resin material, for example, vinyl, polyethylene or the like. The cover member 32 may be displaced in the longitudinal direction with respect to the wires 31 when the linear member 3 vibrates.

As shown in FIG. 1, the linear member 3 includes a plastic flexure portion 34, which is flexed through plastic deformation, near the base end portion 33 thereof. The plastic flexure portion 34 is flexed in a main vibrational direction (a vibrational direction with a maximum amplitude) of the linear member 3. For example, in FIG. 1, the main vibrational direction of the linear member 3 is the same as the main vibrational direction of the wall 1 (a wall surface) of the transmission case on which the vibration damping device is installed, namely, a direction perpendicular to the wall 1 (the wall surface) (the direction indicated by an arrow P).

As shown in FIG. 2B, the plastic flexure portion 34 of the linear member 3 is flexed through plastic deformation and thus compressed in the direction indicated by the arrow Q in FIG. 2B, which is flattened in the cross-section of the linear member 3. The compressive force remains in the plastic flexure portion 34.

A base end-side linear portion 35 and a tip end-side linear portion 36 of the plastic flexure portion 34, which are located on both ends in a longitudinal direction respectively, form a constant angle α with each other. The angle α is a flexural angle of the plastic flexure portion 34. For reasons that described later, it is desirable that the angle α be within a range of 30° to 60°.

The attachment portion 2 fixes the base end portion 33 of the linear member 3 at a position separated from the wall 1 of the transmission case by a predetermined distance L2. As shown in FIG. 1, for example, the attachment portion 2 is composed of a boss portion 21 secured to the wall 1 of the transmission case, a crimping terminal 22 used in wiring lead wires, and a bolt 23 that screws the crimping terminal 22 to the boss portion 21.

The crimping terminal 22 has a cylindrical torso portion 221, and an annular plate portion 222 formed at one end of the torso portion 221. The base end portion 33 of the linear member 3 (the wires 31 and the cover member 32) is inserted into and contact-bonded to the torso portion 221. The annular plate portion 222 is fixed to the boss portion 21 by the bolt 23.

Further, the crimping terminal 22 has a flexure portion 223 flexed oppositely to the direction in which the plastic flexure portion 34 of the linear member 3 is flexed.

As shown in FIG. 1, if a surface of the wall 1 of the transmission case to which the linear member 3 is fixed is generally flat, it is desirable that an expression 1 shown below be satisfied.

$$\tan^{-1}\left(\frac{d}{L1}\right) < \beta \leq \alpha \qquad \text{(Expression 1)}$$

It should be noted that β refers to the angle formed between the surface 11 of the wall 1 of the transmission case (or a back surface of the annular plate portion 222 of the crimping terminal 22) and the base end-side linear portion 35, L1 refers to the length from a border between the plastic flexure portion 34 of the linear member 3 and the tip end-side linear portion 36 thereof to a tip end of the linear member 3, and d refers to the distance from a position of the border closest to the wall 1 to the surface 11 of the wall 1.

Expression 1 means that the tip end-side linear portion 36 is arranged on the wall 1 side of the transmission case with respect to the plastic flexure portion 34 but does not contact the wall 1. By thus arranging the tip end-side linear portion 36, the sufficient vibration space for the linear member 3 is ensured while significantly reducing the space needed to accommodate the vibration damping device.

It should be noted that the specification (length, wire diameter, mass, and the like) of the linear member 3 is set such that the resonance frequency of the linear member 3 is substantially the same as the frequency (resonance frequency) of vibrations of the wall 1 of the transmission case. The resonance frequency of the linear member 3 or a frequency f close thereto may be calculated using expression 2 shown below. The expression 2 is a formula for calculating the bending vibrations of cantilever.

$$f = \frac{1}{2\pi}\left(\frac{\lambda}{L1}\right)^2 \sqrt{\frac{EI}{\rho A}} \qquad \text{(Expression 2)}$$

In Expression 2, λ refers to a coefficient determined by a vibration mode, E refers to a longitudinal elastic coefficient of the linear member 3, I refers to a geometric moment of inertia of the linear member 3, ρ refers to an average density of the linear member 3, and A refers to a cross-sectional area of the linear member 3.

Next, the operation of the vibration damping device according to the embodiment of the invention will be described. When the wall 1 of the transmission case vibrates in the direction indicated by the arrow P, vibrations of the wall 1 are transmitted to the linear member 3 via the boss portion 21 and the crimping terminal 22. The linear member 3 then vibrates with the base end portion 33 serving as a node. Relative displacement occurs in the longitudinal direction among the wires 31 in the linear member 3 and between the wires 31 and the cover member 32. The wires 31 in the linear member 3 and the wires 31 and the cover member 32 rub against one another to convert vibrational energy into frictional heat energy.

As shown in FIG. 2B, the compressive force applied in the direction indicated by the arrow Q remains in the plastic flexure portion 34 of the linear member 3. Therefore, relatively large frictional forces are applied among the plurality of the wires 31 and between the wires 31 and the cover member 32. Further, because the flexural direction of the plastic flexure portion 34 coincides with the main vibrational direction of the linear member 3, the aforementioned compressive force acts as a force for pressing wires whose relative displacement amount in the longitudinal direction is relatively large, namely, the wires inside and outside the plastic flexure portion 34 against one another. As a result, vibrational energy is efficiently converted into frictional heat energy. Consequently, the vibration damping effect of the vibration damping target is enhanced in comparison with a case where the plastic flexure portion 34 is absent.

Further, the fact that the plastic flexure portion 34 is provided in the vicinity of the base end portion 33 of the linear member 3, which serves as a node of vibrations, also enhances the energy conversion efficiency. That is, in the vicinity of the node of vibrations, the relative displacement amount in the longitudinal direction is relatively large among the wires 31 and between the wires 31 and the cover member 32. Therefore, the energy conversion efficiency is higher than in the case where the plastic flexure portion is provided at a position other than the vicinity of the node of vibrations.

Figure 3:
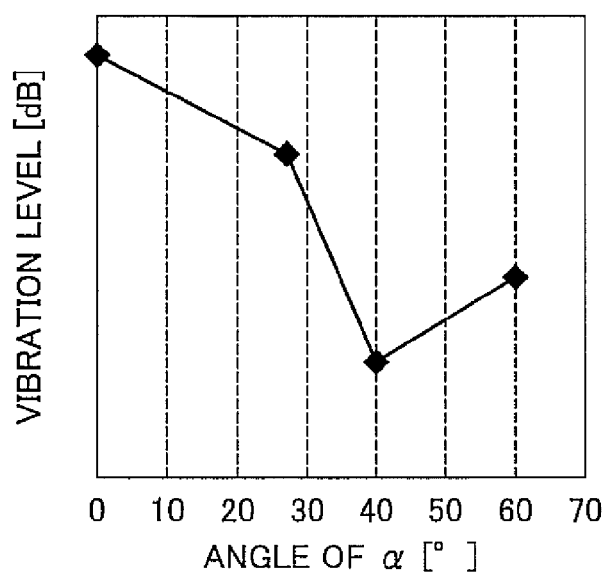
FIG. 3 is a graph showing the experimental result of a test conducted on the vibration damping device according to the embodiment of the invention.

FIG. 3 shows the result of an effect confirmation test for the vibration damping device according to the embodiment of the invention. The ordinate of this graph represents the vibration level of the wall 1 of the transmission case, and the abscissa of the graph represents a flexural angle α of the plastic flexure portion 34. The vibration level of the wall 1 of the transmission case is acquired based on an output value of an acceleration sensor 5 mounted near the boss portion 21 after applying vibrations to the transmission case through hammering with a constant strength. The linear member 3 used in this test has an outer diameter of 3.8 mm, a length of L1=72, and a mass of 2.7.

As indicated by the test result shown in FIG. 3, if the flexural angle α of the plastic flexure portion 34 of the linear member 3 is between 30° and 60°, the vibration level of the wall 1 of the transmission case is relatively low, and a significant vibration damping effect is achieved. In particular, the highest vibration damping effect is achieved when the flexural angle α is about 40°.

The invention is applicable to a vibration damping device that damps vibrations of, for example, a transmission case.

What is claimed is:

1. A vibration damping device for a vibration damping target having a first axis, comprising:
   a linear member having a longitudinal axis parallel to the first axis of the vibration damping target, the linear member including a plurality of wires which are held so that each of the plurality of wires is relatively displaced in a state that the wires are in contact with one another;
   a cover member that covers a periphery of the plurality of wires;
   a boss portion extending generally normal from the first axis of the vibration damping target;
   a crimping terminal mounted to the boss portion, the crimping terminal fixes the plurality of wires and part of the cover member to the boss portion, the crimping terminal and the first axis of the vibration damping target define an acute mounting angle;
   a crimped portion of the linear member having a terminal axis, the terminal axis of the crimped portion and the longitudinal axis of the linear member define an acute flexure angle between 30° and 60°; and
   wherein the linear member includes a plastic flexure portion, the plastic flexure portion is located adjacent to each point where the linear member is fixed to the crimping terminal, the plastic flexure portion of the linear member having a flattened cross-sectional shape.

2. The vibration damping device according to claim 1, wherein the plastic flexure portion has a remaining compressive force.

3. The vibration damping device according to claim 1, wherein the plastic flexure portion is flexed in a main vibrational direction of the linear member.

4. The vibration damping device according to claim 1, wherein the plastic flexure portion is flexed in a main vibrational direction of the vibration damping target.

5. A vibration damping device for a vibration damping target having a first axis, comprising:
   a linear member having a longitudinal axis parallel to the first axis of the vibration damping target, the linear member including a plurality of wires which are held so that each of the plurality of wires is relatively displaced in a state that the wires are in contact with one another;
   a cover member that covers a periphery of the plurality of wires;
   a boss portion extending generally normal from the first axis of the vibration damping target;
   a crimping terminal screwed to the boss portion with a bolt, the crimping terminal fixes the plurality of wires and part of the cover member to the boss portion, the crimping terminal and the first axis of the vibration damping target define an acute mounting angle;
   a crimped portion of the linear member having a terminal axis, the terminal axis of the crimped portion and the longitudinal axis of the linear member define an acute flexure angle between 30° and 60°; and
   wherein the linear member includes a plastic flexure portion, the plastic flexure portion is located adjacent to each point where the linear member is fixed to the crimping terminal, the plastic flexure portion of the linear member having a flattened cross-sectional shape.

6. The vibration damping device according to claim 5, wherein the plastic flexure portion has a remaining compressive force.

7. The vibration damping device according to claim 5, wherein the plastic flexure portion is flexed in a main vibrational direction of the linear member.

8. The vibration damping device according to claim 5, wherein the plastic flexure portion is flexed in a main vibrational direction of the vibration damping target.

* * * * *